United States Patent [19]
Weber et al.

[11] Patent Number: 4,464,016
[45] Date of Patent: Aug. 7, 1984

[54] POWER-ADJUSTED MIRROR WITH MOTOR ON HOUSING AND OFFSET CENTER WHEEL

[75] Inventors: Randall W. Weber; Charles A. Weber, both of Elkhart, Ind.

[73] Assignee: Bock Products, Inc., Elkhart, Ind.

[21] Appl. No.: 439,825

[22] Filed: Nov. 8, 1982

[51] Int. Cl.³ .................... G02B 5/132; B60R 1/06
[52] U.S. Cl. ................................ 350/289; 248/900
[58] Field of Search ............ 350/289, 307; 248/478, 248/479, 483, 484, 900

[56] References Cited

U.S. PATENT DOCUMENTS

| | | | |
|---|---|---|---|
| 3,132,201 | 5/1964 | Bertell et al. | 350/289 X |
| 3,650,607 | 3/1972 | Rogers et al. | 350/289 |
| 4,190,326 | 2/1980 | Brodbeck | 350/289 |
| 4,295,708 | 10/1981 | Albrecht et al. | 350/289 |

Primary Examiner—John K. Corbin
Assistant Examiner—David Lewis
Attorney, Agent, or Firm—Marmaduke A. Hobbs

[57] ABSTRACT

A power-adjusted exterior rear-view mirror for large or long vehicles, having a motor and a remote control switch which permits the driver of the vehicle to adjust the mirror while seated in the driver's seat. The mirror can be mounted on the vehicle using existing attachment brackets and can be wired into the existing electrical system of the vehicle. Upon activation of the switch, the mirror rotates from side to side a short distance in a slow and continuous motion until proper adjustment is reached and the switch is turned off. A spring located inside the mirror assembly provides tension to hold the mirror in its adjusted position, and to permit the mirror to give way to a force applied rearwardly on its outside edge and to turn toward the vehicle, then to return the mirror to its original position when the force is removed.

11 Claims, 6 Drawing Figures

U.S. Patent   Aug. 7, 1984   Sheet 2 of 2   4,464,016
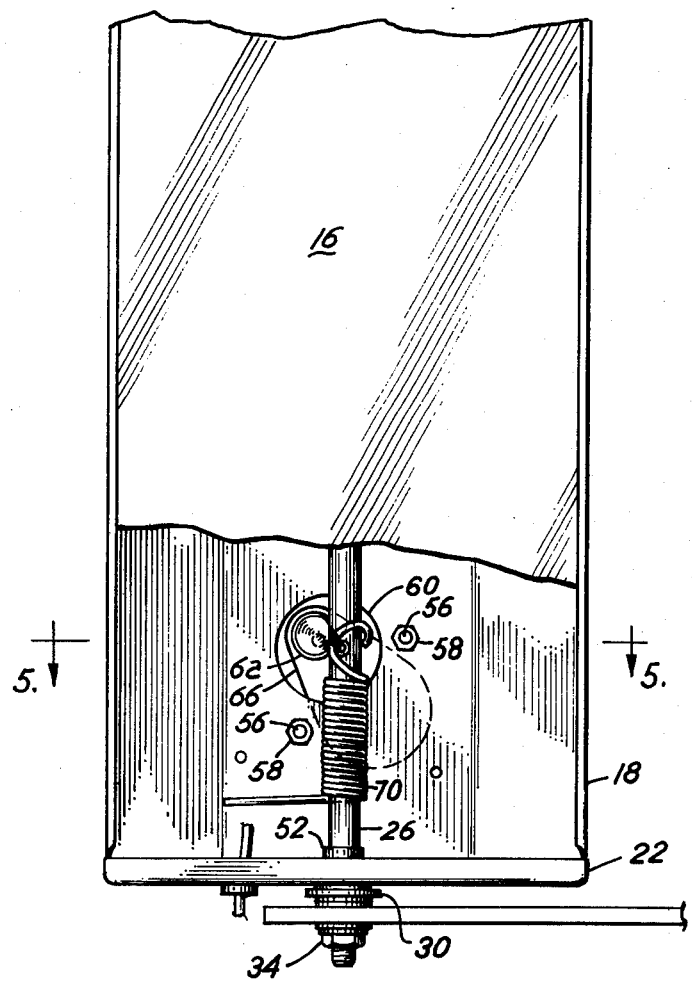
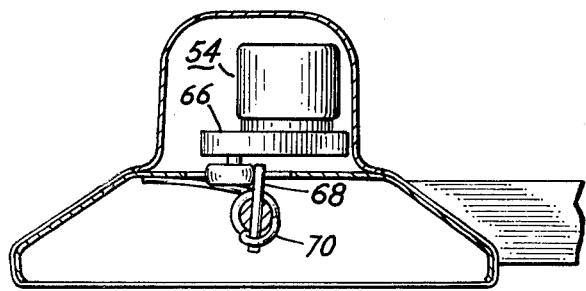
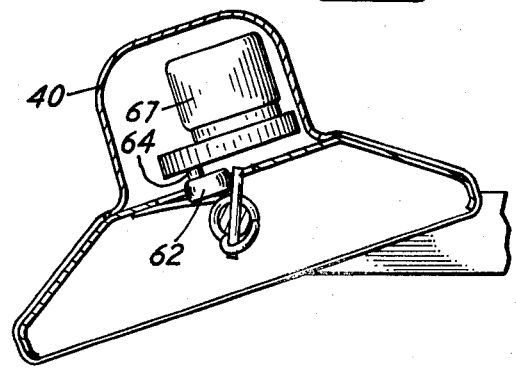

POWER-ADJUSTED MIRROR WITH MOTOR ON HOUSING AND OFFSET CENTER WHEEL

BACKGROUND OF THE INVENTION

Drivers of semi-trailer trucks, buses, motor homes, and other large and long vehicles of this type rely heavily on their outside rear-view mirrors, located one to each side of the vehicle, usually mounted on or directly in front of the vehicle's front doors. These mirrors afford the drivers a view of the sides of their vehicles and the areas behind and adjacent the vehicles on both right and left sides. Proper adjustment of these mirrors is critical to the safe operation of the vehicles as many are forty feet in length or longer. The mirrors are used at all times during operation of the vehicles, especially when backing up, in turning situations, and in overtaking and passing other vehicles, on city streets as well as on highways. Currently, adjustment of these mirrors is accomplished manually, with the operators making a preliminary adjustment, returning to their seat to check the view, then getting up to adjust again, if necessary. In many instances, several adjustments of this type are required before the mirrors are set properly for safe operation.

SUMMARY OF THE INVENTION

It is, therefore, one of the principal objects of this invention to provide a power-adjusted outside rear-view mirror for large or long vehicles, equipped with a motor and remote-control switches which are straightforward and easy to operate, to allow the drivers to adjust their mirrors while seated in the driving position. This will eliminate the need to make a preliminary adjustment, sit down and check the view, and possibly repeat this sequence until the proper adjustment is obtained.

Another object of the present invention is to provide for safer operation of these vehicles by making adjustment of the mirrors virtually effortless, thus providing for situations where the drivers are in a hurry and normally forego proper adjustment of the mirrors in favor of leaning forward or backward in their seat to obtain a clear view.

It is a further object of this invention to provide a means for protecting these mirrors from damage or misalignment caused by hazards common to exterior mirrors, such as sideswiping or strong winds. A spring is provided and disposed to allow the mirror, when struck from the front on its leading, outside edge, to give way to the force applied and swivel toward the vehicle, returning by way of the spring to its original position once the force is released. The spring also acts as a check on the adjustment provided by the motor, ensuring stability against the ambient forces acting on the mirrors during operation, i.e. wind, driving rain, etc.

It is a still further object to provide a power-adjusted vehicle mirror which can be easily installed using currently existing mounting brackets and which can be wired to the existing electrical system of the vehicle, thus avoiding costly modifications. In addition, the present invention provides a durable assembly that will provide long life with little or no maintenance required.

These and other objects are accomplished by the present invention which relates to a power-adjusted exterior rear-view mirror for large or long vehicles and includes a housing, a mirror plate mounted on the housing, a motor and spring assembly disposed in the housing, and a remote control switch located inside the vehicle, thus providing a means to adjust the position of the mirror from the driver's seat. The motor assembly drives a wheel connected to the motor by a shaft offset from the center of the wheel. The wheel is urged by the spring against a stationary lug, such as a pin, disposed in a rod in the housing, and the opposing forces provided by the motor and spring are used to adjust the mirror. The housing is pivoted at the top and bottom, preferably on a center rod having top and bottom collars mounted thereon and disposed in the top and bottom housing members, respectively. The rod may have threaded ends for attachment to a mounting bracket on the vehicle, and the collars permit the mirror to rotate from side to side relative to the center rod.

BRIEF DESCRIPTION OF THE DRAWINGS

FIG. 4 is a fragmentary, front elevational view of the power-adjusted mirror shown in the preceding figures, with a portion of the glass mirror surface broken away to reveal the adjustment mechanism;

FIG. 5 is a horizontal cross sectional view of the power-adjusted mirror shown in the preceding figures, the section being taken on line 5—5 of FIG. 4, showing one of the adjustment positions; and FIG. 6 is a horizontal cross sectional view of the power-adjusted mirror, the section also taken on line 5—5 of FIG. 4, showing another of the adjustment positions.

DETAILED DESCRIPTION OF THE PREFERRED EMBODIMENT

Figure 1:
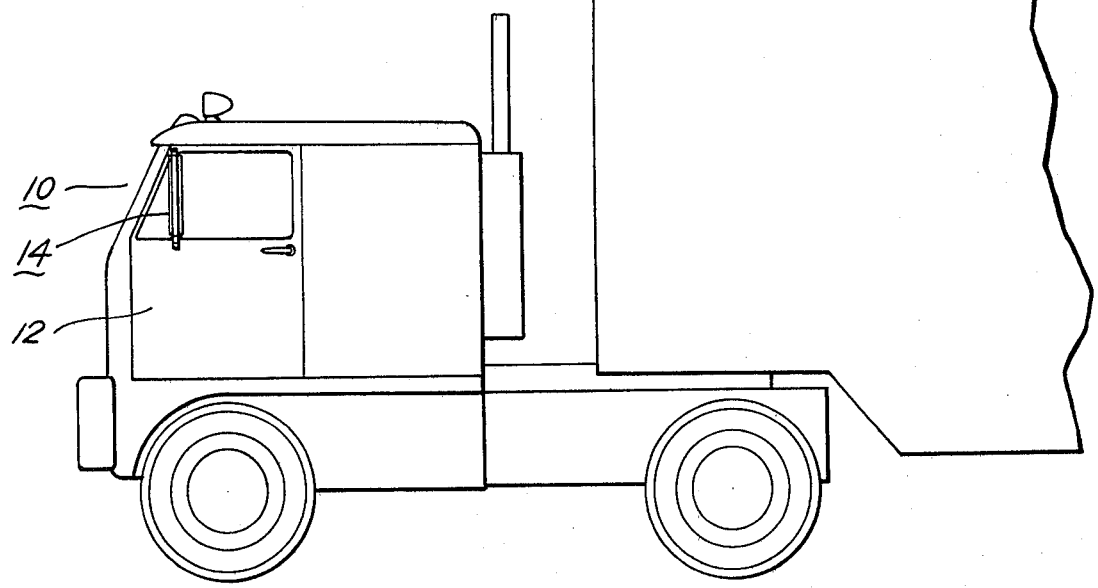
FIG. 1 is a side elevational view of a semi-trailer truck with the power-adjusted mirror embodying the present invention mounted on the front door of the cab.

Referring more specifically to the drawings, and to FIG. 1 in particular, numeral 10 indicates generally a semi-trailer truck showing the driver's side door 12 with the power-adjusted mirror 14 embodying the present invention mounted thereon. It is to be understood that the vehicle shown is for illustration purposes only, in that the present invention may be adapted for use on a wide variety of vehicles, with the size of the power-adjusted mirror and its placement on the vehicle variable depending on the location of the existing mounting hardware and the particular requirements of the vehicle itself. Adjustment of the mirror is accomplished from the driver's seat and a mirror is normally provided on each side of the vehicle. The following description and drawings relate to the mirror located on the driver's side.

Figure 2:
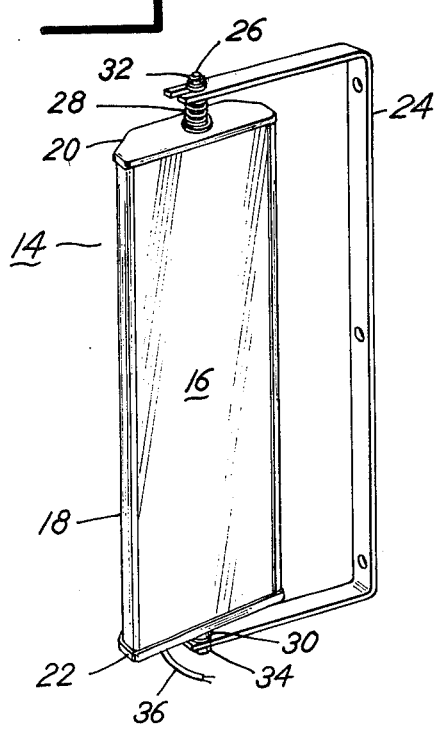
FIG. 2 is a perspective view of the power-adjusted mirror showing the mirror side of the invention.
Figure 3:
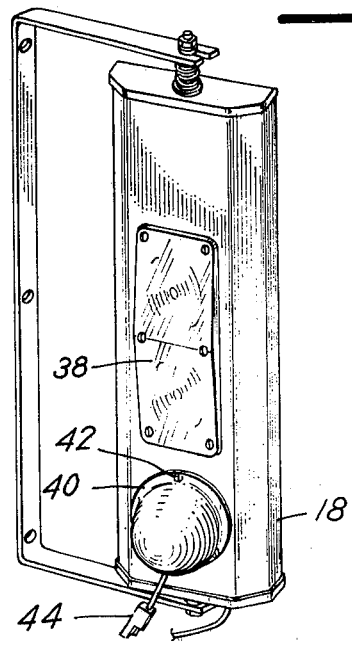
FIG. 3 is a perspective view of the rear of the power-adjusted mirror shown in FIG. 2.

Referring now to FIGS. 2 and 3, numeral 14 indicates generally the power-adjusted mirror embodying the present invention, having a glass mirror plate 16 supported by a housing 18 with a top housing member 20 and a bottom housing member 22. Either or both the top member and the bottom member are removable to permit installation of a new mirror plate should breakage occur.

A conventional mounting bracket 24 is shown having holes for mounting the power-adjusted mirror on the door of the truck and is attached to a rod 26 which extends vertically the entire length of the mirror between the housing 18 and the glass mirror plate. A plurality of washers 28 and 30 are disposed on rod 26 for use in making adjustments at the top and bottom, respectively, between the ends of the housing and the bracket. The ends of rod 26 are threaded and nuts 32 and 34, for the top and bottom, respectively, are used to secure the mirror assembly to the mounting bracket. A power cord 36 extends from the existing electrical system of the vehicle to light sockets, with bulbs therein, inside the mirror assembly, said light sockets located in front of an amber-colored plastic plate 38, amber-color indicating that the mirror is located near the front end of the vehicle. A rounded metal cap 40 is used to cover the motor assembly and is secured to the back of housing 18 by a plurality of screws 42. A power cord assembly 44 with a connector pod thereon extends from the motor to the existing electrical system of the vehicle and is wired thereto.

Referring now to FIG. 4, rod 26 can be seen extending vertically in the mirror assembly, between mirror plate 16 and housing 18. Collar 52 is located on rod 26 and disposed in bottom housing member 22 to allow the housing and mirror assembly to rotate thereon. An identical collar (not shown) is located in top housing member 20 and serves the same purpose as collar 52.

Motor assembly 54 is mounted on the back of housing 18 and is secured thereto by screws 56 and nuts 58 and a hole 60 in housing 18 is provided to permit an adjusting wheel 62 to protrude inside the mirror assembly. Adjusting wheel 62 is connected to a shaft 64 which is offset from the center of wheel 62, thus providing an elliptical form of rotation of the wheel. Shaft 64 is connected to a speed reducer 66 which is geared to convert the relatively high speed of the motor 67 to a slow and steady rotation suitable for adjusting the mirror. A lug 68, such as a pin, is inserted through rod 26 and rests against the adjusting wheel 62 providing a stationary abutment against which the wheel reacts to cause adjustments in the mirror, and a spring 70, disposed around rod 26 and held in position at the top of the spring by a loop on lug 68 and at the bottom by a protruding leg which contacts housing 18, constantly urges the wheel, which moves with the housing, into contact with the lug.

The action of the offset shaft 64 and adjusting wheel 62 can be clearly seen in FIGS. 5 and 6. As the shaft is rotated by motor 67 through speed reducer 66, the eccentric wheel reacts against stationary lug 68 to oscillate the housing 18 on rod 26. When the shaft is furthest from the lug, as shown in FIG. 6, the enlarged offset part of the wheel is between the shaft and the lug, and the mirror is turned toward the vehicle. As the wheel rotates further, the eccentric wheel permits the shaft to move closer to the lug, as shown in FIG. 5, and spring 70 rotates the mirror away from the vehicle. The wheel rotates in one direction and the mirror is continuously adjustable toward or away from the vehicle by the opposing forces supplied by the motor and the spring.

The preceding description was concerned with the power-adjusted mirror for the driver's side of the vehicle. The features for the passenger's, or right side of the vehicle, would be the same, only in opposite configurations.

In the use and operation of the present power-adjusted mirror, the device is installed on a semi-trailer truck or other vehicle using the existing mounting hardware. The size of the power adjusted mirror and its location on the vehicle will be determined by the particular vehicle. The power cords for the motor and for the lights are routed through the vehicle in a convenient manner and wired into the existing electrical system. Remote control switches of a conventional type are located within easy reach of the the driver when seated in the driving position. Upon activation of the remote control switches, the motor turns the speed reducer 66 which, in turn, causes the adjusting wheel 62 with its offset shaft 64 to rotate. Adjusting wheel 62, being in contact with stationary lug 68 in the stationary rod 26, exerts pressure against lug 68 and causes the mirror assembly to swivel towards the vehicle and then back again in the opposite direction, as shown in FIGS. 5 and 6. As long as the remote control switch is held in an on position, the mirror assembly exhibits a slow and continuous adjustment motion. When a proper adjustment point is reached, the driver releases the switch and the mirror stops. The same procedure is followed for the mirror on the right side of the vehicle until it is in proper position for safe operation of the vehicle. The spring 70 provides tension which holds the mirror in its adjusted position and also protects the mirror and motor assembly from damage caused by a force applied rearwardly to the outside edge of the mirror. When struck on that edge, the mirror assembly turns toward the vehicle body, away from the applied force, and then returns under the action of the spring to its original position. Thus, adjusting wheel 62 is pulled away from stationary lug 68 by the force applied, preventing or minimizing damage to the housing, mirror plate, and motor assembly, and returns to its engagement with the lug when the force is released.

Although one embodiment of a power-adjusted mirror has been shown and described in detail herein, various changes and modifications may be made without departing from the scope of the invention.

We claim:

1. A power-adjusted mirror for mounting on a vehicle, comprising a housing with a mirror plate disposed on one side thereof, rod means about which said housing rotates extending vertically in said housing, a lug projecting laterally from said rod means, a wheel having an offset center of rotation and including a drive shaft on said offset center, said wheel disposed against said lug, motor means mounted on said housing for rotating said wheel, a resilient means for urging said wheel into contact with said lug and for urging said housing and mirror plate to various adjusted angular positions relative to said rod means.

2. A power-adjusted mirror as defined in claim 1 in which said housing includes side and back members and removable top and bottom members, and said mirror plate forms the front of said housing.

3. A power-adjusted mirror as defined in claim 2 in which said rod means consists of a rod extending vertically the length of said mirror, with threaded ends for connection to a bracket on said vehicle and for holding said rod stationary.

4. A power-adjusted mirror as defined in claim 1 in which said lug on said rod means forms a fixed abutment against which said wheel exerts a force for moving said housing angularly relative to said rod.

5. A power-adjusted mirror as defined in claim 1 in which said wheel is connected by a shaft on said offset center to said means for rotating said wheel.

6. A power-adjusted mirror as defined in claim 5 in which said motor means for rotating said wheel includes a motor and a speed reducer, said speed reducer being connected to said wheel by said shaft, and said motor being powered by the existing electrical system of said vehicle and activated by a remote control switch located inside said vehicle.

7. A power-adjusted mirror as defined in claim 1 in which said resilient means consists of a spring disposed around said rod means for urging said wheel into contact with said lug.

8. A power-adjusted mirror as defined in claim 3 in which top and bottom collars are disposed around said rod means and inserted into said top and bottom housing members, respectively.

9. A power-adjusted mirror for mounting on a vehicle, comprising a housing with a mirror plate disposed on one side thereof, a rod means extending vertically in said housing, a lug projecting laterally from said rod means, a wheel disposed against said lug and having a drive shaft on an offset center of rotation of said wheel, a motor means for rotating said wheel, a means pivotally mounting said housing for rotation relative to said rod means, and a resilient means for urging said wheel and lug into engagement with one another and for protecting said housing and said motor means from damage caused by a force applied rearwardly on the outside edge of said housing.

10. A power-adjusted mirror as defined in claim 9 in which said resilient means consists of a spring disposed around said rod means, with the upper end of said spring disposed around said lug and the lower end of said spring extending horizontally and operatively connected to said housing.

11. A power-adjusted mirror as defined in claim 9 in which said motor means includes a motor and a speed reducer and said motor is powered by the existing electrical system of said vehicle.

* * * * *